(No Model.)
F. D. MONTAGUE.
APPARATUS FOR DISTRIBUTING OIL UPON SEAS.
No. 335,035. Patented Jan. 26, 1886.
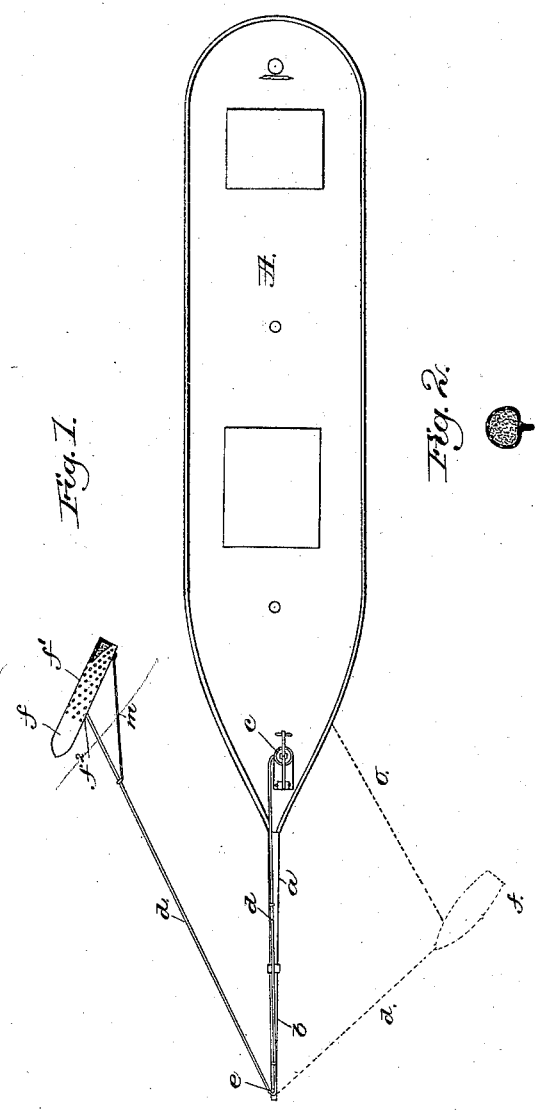

UNITED STATES PATENT OFFICE.

FRANCIS D. MONTAGUE, OF MILFORD, MASSACHUSETTS.

APPARATUS FOR DISTRIBUTING OIL UPON SEAS.

SPECIFICATION forming part of Letters Patent No. 335,035, dated January 26, 1886.

Application filed October 19, 1885. Serial No. 180,263. (No model.)

*To all whom it may concern:*

Be it known that I, FRANCIS D. MONTAGUE, of Milford, county of Worcester, and State of Massachusetts, have invented an Improvement in Apparatus for Distributing Oil on the Surface of Troubled Seas, of which the following description, in connection with the accompanying drawings, is a specification, like letters on the drawings representing like parts.

This invention has for its object to provide a vessel with suitable devices, which, when desired, may be placed in operative position to distribute over the surface of the troubled waters a film of oil.

The invention herein contained consists in the combination, with a vessel, of a force-pump located at any suitable part thereof and arranged to take oil from a suitable tank, a tube connected with the force-pump and serving as a discharge-pipe therefor, to the extreme end of which is attached a floating distributer, whereby oil may be pumped from the tank and forced through the discharge-pipe into the distributer, which latter, made as a hollow perforated shell filled with absorbent material and floating upon the water, discharges and distributes the oil slowly over the water. The tube, which may be made of any suitable material, is preferably extended to and around a grid on the end of the bowsprit, and thence to the distributer, to which it is connected by suitable cords or other means, so that the distributer will retain its position a certain distance from the vessel.

Figure 1 shows in top view a vessel with the device herein to be described for distributing oil attached thereto, and Fig. 2 a detail to be referred to.

The vessel A, having a bowsprit, a, and jib-boom b, are all of any usual or suitable construction.

The force-pump c, of any suitable construction, is herein shown as located in the bow of the vessel, and is arranged to take oil from a tank or barrel located in the hold or elsewhere. (Not shown.)

The force-pump c forces the oil received from the tank through a flexible or other tube, d, herein shown as extended forward along the entire length of the bowsprit a, and to it and around a grid, e, upon the end of the jib-boom b, and thence to the distributer f. The distributer f is herein shown as a hollow pointed shell having closed ends and perforated sides, as shown at f, the said distributer, at or near its forward end, as at $f^2$, being attached to the tube d.

The distributer f is filled with absorbent material, the nature of which depends upon the material of which the distributer is composed, viz: If made of metal, the absorbent material will preferably be cork chips; but if made of wood, oakum or cotton-waste would answer.

The distributer, attached to the flexible tube d, is carried upon the vessel, and in case of storm or high winds, or under such other circumstances as cause the water to be much disturbed, it is thrown overboard, and by the aid of the cord m, connecting the rear end of the distributer with the tube d some distance from its junction therewith, causes the said distributer to float upon the water a definite distance from the vessel.

The distributer is preferably provided with a keel, as shown in detail, Fig. 2.

After the distributer has been thrown overboard the oil is forced through the tube d by the force-pump c, and, saturating the absorbent material, it oozes from the shell f, forming a thin film over the surface of the water.

In case of very rough weather, or when going before the wind, two distributers may be employed, one being located at each side of the vessel.

When a vessel is lying at anchor and it is necessary to calm the water, the distributer herein shown may serve as the anchor-buoy, as shown in dotted lines, Fig. 1, the usual cable running from the vesssel to said anchor-buoy or the distributer, and the usual anchor-line being attached thereto.

It will be obvious that the distributer will be variously located, depending upon the circumstances under which it is obliged to be used.

The flexible tube, preferably having a ball attached to its end, may be thrown over a vessel in distress, as a rope is now commonly employed, and the oil forced through the tube, distributing itself over the surface of the water. In this latter instance the tube itself may have its end either opened or closed and its sides perforated, the end of the tube for the length it is perforated serving as the distributer.

The floating distributer herein described may be connected with a line leading from the shore, said line being thrown as usual over a vessel, after which the distributer, having a flexible discharge-pipe connected therewith, is drawn to the vessel, and oil is forced by a force-pump upon the shore through the discharge-tube and distributer, which, as it is drawn to the vessel, leaves an oily path, in which a life-boat may safely ride to the vessel.

I claim—

1. In an apparatus for distributing oil over the surface of water, a vessel combined with a force-pump, supply-pipe therefor, a flexible discharge-tube leading therefrom, and a floating distributer, substantially as described, connected with the end of the discharge-tube, as set forth.

2. The combination, with a vessel, of a force-pump, supply-pipe therefor, a discharge-tube leading therefrom to and from the end of the jib-boom, and a distributer attached to the end of the tube to distribute the oil forced through the tube and into the distributer upon the surface of the water, substantially as described.

3. The combination, with a vessel, of a force-pump, supply-pipe therefor, the discharge-tube and distributer, the latter consisting of a hollow shell having perforated sides and closed ends, substantially as described.

4. The force-pump $c$ and supply-pipe therefor, flexible discharge-tube $d$, passing to and around a grid on the end of the jib-boom, the distributer $f$, and cord $m$, substantially as described.

5. The floating distributer $f$ for receiving oil and distributing it over the surface of the water, the same consisting of a hollow shell having perforated sides and closed ends, and a keel, the forward end being pointed, all as shown and described.

6. In an apparatus for distributing oil over the surface of water, a force-pump, supply-pipe therefor, a flexible discharge-pipe leading therefrom, and a floating distributer, substantially as described, connected with the end of the discharge-pipe, as set forth.

In testimony whereof I have signed my name to this specification in the presence of two subscribing witnesses.

FRANCIS D. MONTAGUE.

Witnesses:
C. B. WETHERBY,
A. WHEELER.